Oct. 25, 1932. L. F. MORONEY 1,884,114
GRAIN HARVESTING MACHINE
Filed April 22, 1930 2 Sheets-Sheet 1
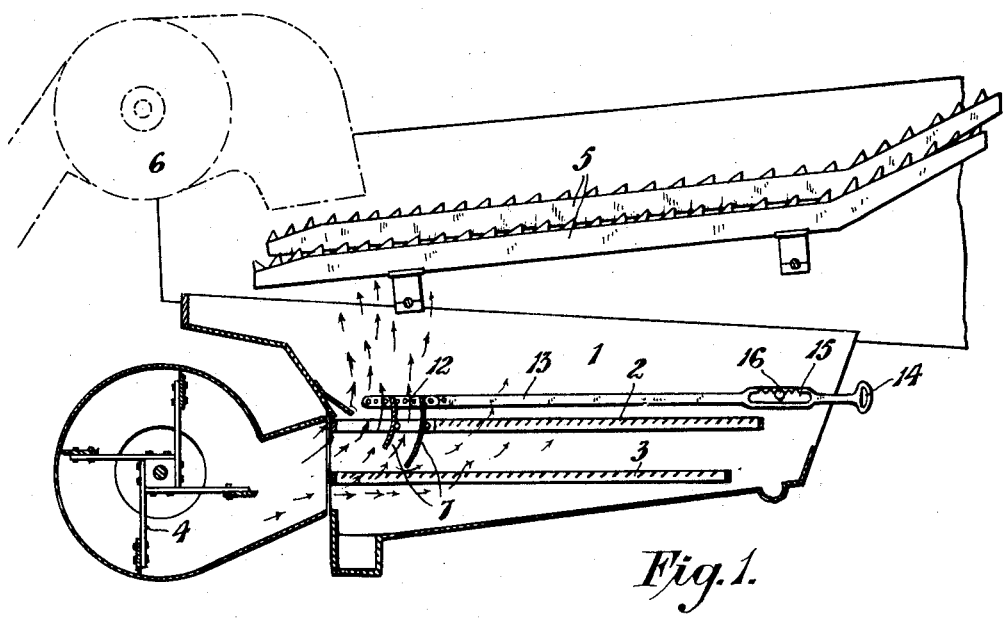
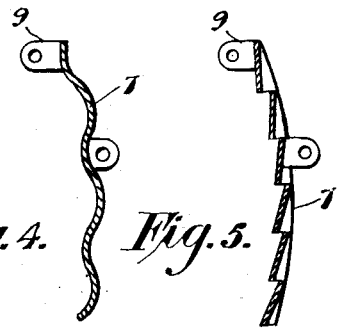
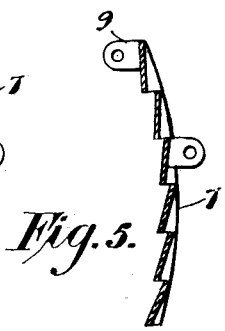
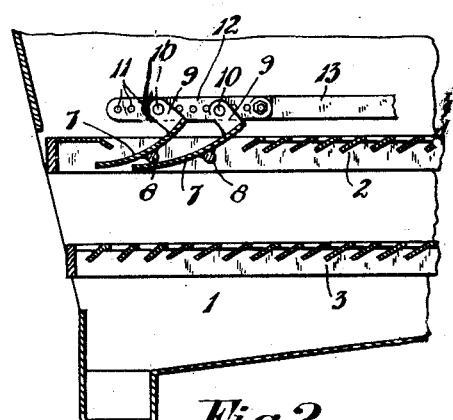
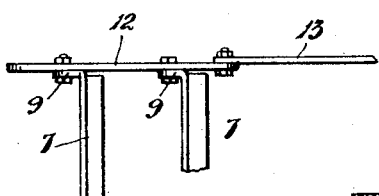
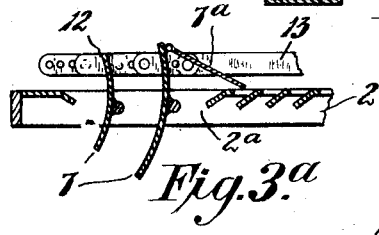
INVENTOR
L. F. MORONEY

INVENTOR
L. F. MORONEY

Patented Oct. 25, 1932

1,884,114

UNITED STATES PATENT OFFICE

LAWRENCE FRANCIS MORONEY, OF LARA, VICTORIA, AUSTRALIA

GRAIN HARVESTING MACHINE

Application filed April 22, 1930, Serial No. 446,345, and in Australia December 31, 1929.

This invention relates to grain harvesting machines of the type having straw-walkers, and it refers more specifically to means for directing portion of the wind from the fan upwardly to the straw-walkers of the machine.

In harvesting machines of present types the blast from the fan is directed across and beneath the riddles and very little, if any, wind from the fan reaches the straw-walkers. The present invention consists broadly in the provision of one or more deflectors positioned within the riddle box and adapted to direct portion of the wind from the fan upwardly directly to the straw-walkers. This deflected wind functions to discharge dust and chaff from the thrashed mass of material thrown from the thrashing drum onto the front portion of the straw-walkers, and thus it facilitates free passage of the grain through the straw-walkers to the riddles.

In the accompanying drawings: —

Figure 1 is a sectional view showing the invention incorporated in an ordinary standard grain harvester.

Figure 2 is a view showing the deflectors in adjusted position.

Figure 3 is a view showing a constructional detail.

Figure 3a shows a hinged sloping plate fitted to the rear deflector.

Figures 4 and 5 illustrate alternative forms of deflectors which may be used in lieu of the plain curved deflectors shown in Figures 1 and 2.

Figure 6:
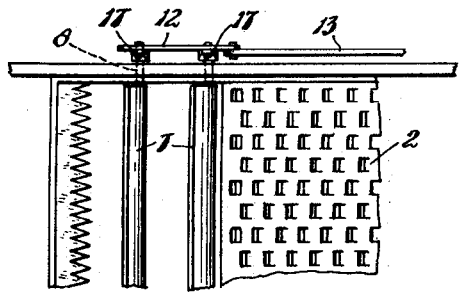
Figure 6 is a plan view showing a slightly modified form of the invention.

In these views, 1 indicates the ordinary riddle box of a grain harvesting machine such as a header harvester, 2 and 3 the usual riddles, 4 the fan for supplying the blast to the riddles, 5 the straw-walkers, and 6 the thrashing drum, all of which parts are of ordinary standard construction.

According to the invention one or more deflectors 7 are provided within the riddle box 1 to direct a portion of the blast from the fan 4 upwardly directly to the straw-walkers 5. Said deflector or deflectors are preferably mounted adjacent to the forward end of the upper riddle 2, as shown in the drawings, so that the blast across the lower riddle 3 is not appreciably affected.

In the preferred form of the invention, illustrated in Figures 1 to 3, two deflectors 7 of curved shape are used and are mounted one behind the other in suitably spaced relationship. The rear deflector is preferably made slightly wider than the front deflector so that its lower edge extends slightly lower than said front deflector.

The deflectors are both supported by the forward part of the riddle frame and they may be either stationary or adjustable. In the drawings, both deflectors are mounted on pivot rods 8 which have their ends supported freely in the riddle frame. The upper ends of the deflectors have lugs 9 which pivotally receive pins 10 passed through adjustment holes 11 in a bar 12. The end of said bar is pivotally connected to an actuating rod 13 which extends to the rear end of the riddle box and is provided with a suitable manipulating handle 14. The rod 12 has a slotted catch member 15 which engages a pin 16 to hold the parts in selected adjusted position. By operating the handle 14, the deflectors 7 can be angularly adjusted in unison on their pivots 8, see Figure 2, to vary the direction of the upward blast as desired and thus regulate the point at which it strikes the underside of the straw-walkers. The provision of the adjustment holes 11 in the bar 12 enables the deflectors to be angularly adjusted individually for the correct setting.

In use, the deflectors 7 function to cause a portion of the blast from the fan 4 to be deflected upwardly to directly beneath the front part of the straw-walkers 5, as traced by the arrows in Figure 1. This deflected wind acts on the thrashed mass of material being deposited onto the straw-walkers from the thrashing drum 6 and causes the dust, chaff and lighter materials therein to be blown away. The separation of the grain from straw is thus considerably assisted and the grain is enabled to fall freely through the straw-walkers onto the riddles for further treatment in the usual manner. Loss of grain through grain being discharged with the straw from the straw-walkers is thus prevented.

To prevent grain and material from lodging on the portion 2a of the riddle which is shielded from the blast by the rear deflector, a sloping plate 7a may be hinged loosely to the upper end of the deflector, see Figure 3a. This plate lies against the surface of the riddle and serves to direct the material onto the rear portion of the riddle where it is subjected to the blast. When the deflectors are adjusted, the sloping plate 7a is enabled to adjust itself automatically by reason of its hinged connection to the upper end of said deflector.

The deflectors 7 may be of any desired shape. In Figures 1 and 2 they are of plain curved shape, while in Figure 4 a corrugated form of deflector is shown. Figure 5 shows an alternative form of deflector which is of curved shape and of louvre-like construction.

Figure 7:
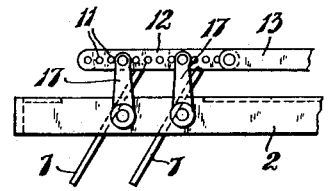
Figure 7 is a side view of Figure 6.

In the modification shown in Figures 6 and 7, the deflectors are of straight construction and the adjusting rod 13 is positioned exteriorly of the riddle box. The pivot rods 8 extend through the wall of the riddle box and are fitted with arms 17 which are pivotally connected to the bar 12.

Figure 8:
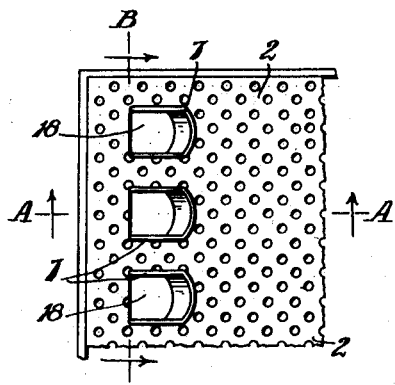
Figure 8 shows another modified construction.
Figure 11:
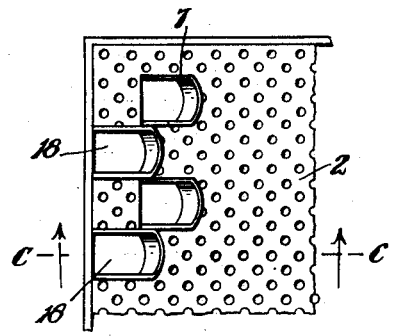
Figure 11 is a plan view of a further modification.
Figure 9:
Figures 9 and 10 are sectional views taken on the lines A—A and B—B respectively of Figure 8.
Figure 12:
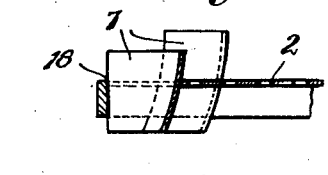
Figure 12 is a sectional view on the line C—C of Figure 11.
Figure 13:
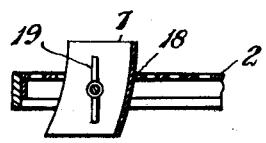
Figure 13 is a sectional view showing a still further modification.
Figure 10:
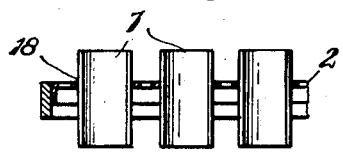

According to the form of the invention shown in Figures 8, 9 and 10, spaced openings 18 are formed in the front part of the riddle 2 and the deflectors are fitted within said openings. Each deflector is substantially of channel-shape so that it forms a flue-like passage for directing the wind upwardly to the straw-walkers. In this form the deflectors are stationarily supported in angular position and may be either flat or slightly curved, as desired. They may be arranged all in alignment as shown in Figure 8, or alternatively, they may be in staggered formation as shown in Figures 11 and 12. If desired, a pivoted control vane 19 may be provided in each channel-shaped deflector to control the direction of the upward blast, as may be desired under particular conditions.

What I do claim is:

1. In a grain separator, the combination of a housing formed at its front end with an opening, a series of vibratory riddles in the housing in substantial alignment with the opening therein, the upper riddle being open at its front end adjacent the opening in the housing, deflectors pivoted in the open end of the upper riddle, means for operating the deflectors to cause said deflectors to substantially span the space between the riddles, means for adjusting the position of the deflectors relative to each other, a series of straw walkers above and spaced from the riddles, and a blower, the casing of which communicates with the opening in front of the housing, whereby when the deflectors are adjusted in the space between the upper riddle and the next adjacent riddle, the air from the blower will be divided, part passing through the riddles and part being deflected to the forward portion of the straw walkers.

2. In a grain separator, the combination of a housing formed at its front end with an opening, a series of vibratory riddles in the housing in substantial alignment with the opening therein, the upper riddle being open at its front end adjacent the opening in the housing, deflectors pivoted in the open end of the upper riddle, means for operating the deflectors to cause said deflectors to substantially span the space between the riddles, an inclined member hinged to the rearmost deflector and extending over the riddles, means for adjusting the position of the deflectors relative to each other, a series of straw walkers above and spaced from the riddles, and a blower, the casing of which communicates with the opening in front of the housing, whereby when the deflectors are adjusted in the space between the upper riddle and the next adjacent riddle, the air from the blower will be divided, part passing through the riddles and part being deflected to the forward portion of the straw walkers.

3. In a grain separator as described in claim 1, wherein each deflector comprises a series of spaced apart horizontal plates.

4. In a grain separator, the combination of a housing formed at its front end with an opening, a series of vibratory riddles in the housing in substantial alignment with the opening therein, the upper riddle being open at its front end adjacent the opening in the housing, horizontally corrugated deflectors pivoted in the open end of the upper riddle, a bar for operating the deflectors to cause said deflectors to substantially span the space between the riddles, said bar being formed with a series of openings to selectively receive the deflectors for adjustment relative to each other, a series of straw walkers above and spaced from the riddles, and a blower, the casing of which communicates with the opening in front of the housing, whereby when the corrugated deflectors are adjusted in the space between the upper riddle and the next adjacent riddle, the air from the blower will be divided, part passing through the riddles and part being deflected to the forward portion of the straw walkers.

5. A grain separator including a casing, upper and lower riddles carried in said casing, a blower directing a current of air across the riddles, deflectors pivotally mounted in said upper riddle, means for adjusting the angle of the deflectors relative to the current of air to direct the chaff and straw upwardly, and means for preventing the chaff and straw from lodging in the dead air space directly behind the deflectors.

6. A grain separator including a casing, upper and lower riddles carried in said casing, a blower directing a current of air across said riddles, deflectors associated with the upper riddle to direct the current of air upwardly to carry off the chaff and straw, and means carried by the deflectors to prevent the chaff and straw from lodging in the dead air space directly behind the deflectors.

In testimony whereof I affix my signature.

L. F. MORONEY.